United States Patent
Rudick (10) Patent No.: US 11,209,270 B2
(45) Date of Patent: Dec. 28, 2021

(54) LEVELING TOOL

(71) Applicant: The RU LLC, Brooklyn Park, MN (US)

(72) Inventor: Luke Rudick, Brooklyn Park, MN (US)

(73) Assignee: The RU LLC, Brooklyn Park, MN (US)

( * ) Notice: Subject to any disclaimer, the term of this patent is extended or adjusted under 35 U.S.C. 154(b) by 0 days.

(21) Appl. No.: 17/038,008

(22) Filed: Sep. 30, 2020

(65) Prior Publication Data

US 2021/0102805 A1 Apr. 8, 2021

Related U.S. Application Data (60) Provisional application No. 62/909,899, filed on Oct. 3, 2019.

(51) Int. Cl.
*G01C 9/28* (2006.01)
*G01C 9/34* (2006.01)

(52) U.S. Cl.
CPC ........ *G01C 9/28* (2013.01); *G01C 9/34* (2013.01)

(58) Field of Classification Search
CPC ..................................................... G01C 9/28
USPC .......................................... 33/370, 371, 373
See application file for complete search history.

(56) References Cited

U.S. PATENT DOCUMENTS

| | | | |
|---|---|---|---|
| 1,489,572 A | 4/1924 | Bennewitz | |
| 3,750,301 A * | 8/1973 | Johnson | G01C 9/28 33/379 |
| D242,231 S | 11/1976 | Shaffer | |
| 4,785,544 A * | 11/1988 | Heinsius | B25H 1/0085 33/334 |
| 4,986,002 A * | 1/1991 | Oros | B23K 9/287 33/334 |
| 5,163,233 A * | 11/1992 | Benson | E04G 21/1841 269/904 |
| 5,799,404 A | 9/1998 | Payne | |
| 6,131,298 A * | 10/2000 | McKinney | G01C 9/28 33/370 |
| 6,976,805 B2 | 12/2005 | Quenzi et al. | |
| D562,710 S | 2/2008 | Lim | |
| 8,402,667 B2 * | 3/2013 | Spaulding | G01C 9/26 33/372 |
| 8,677,636 B2 * | 3/2014 | Kelley | G01C 9/28 33/194 |
| 9,347,774 B2 * | 5/2016 | Christianson | G01C 9/28 |
| 9,733,077 B2 * | 8/2017 | Swisher | G01C 9/02 |
| 10,935,380 B2 * | 3/2021 | Cochran | G01C 9/28 |
| 2013/0283625 A1 * | 10/2013 | Sullivan | G01C 9/28 33/371 |

OTHER PUBLICATIONS

Bon Tool Bolt-on Screed Level. Website. Retrieved Feb. 2019. https://www.trusupply.com/bolt-on-screed-level.html.

(Continued)

*Primary Examiner* — George B Bennett
(74) *Attorney, Agent, or Firm* — Grumbles Law PLLC; Brittany Nanzig (57) ABSTRACT

A leveling tool is provided that includes an elongated base member having a first set of opposing sides, the first set of opposing sides having a smooth, even edge. The leveling tool also includes a clamp that has at least one level detecting element disposed thereon, is flexible, and fits snugly around a second set of opposing sides of the elongated base member.

15 Claims, 7 Drawing Sheets

(56) References Cited

OTHER PUBLICATIONS

CST/berger. Website. Retrieved Feb. 2019. htttps://www.amazon.com/CST-06-950-30 Minute Detachable-Fiberglass/dp.

* cited by examiner

LEVELING TOOL

RELATED APPLICATIONS

This application claims the benefit of U.S. Provisional Patent Application Ser. No. 62/909,899 filed Oct. 3, 2019, currently titled, "LEVELING TOOL" which is herein incorporated by reference in its entirety.

FIELD

This disclosure relates to leveling tools for building construction. This disclosure further relates to articles and methods useful for leveling in more than one dimension.

BACKGROUND

Building construction frequently requires tools that enable the positioning of framing materials. For example, when wall studs are attached to a base element such as a subfloor or floor, a builder will use a leveling device to assure that the stud is perpendicular to the floor. Leveling devices can have bubble levels in one or more dimensions. Using the bubble level a carpenter, for example, can assure the stud is upright and perpendicular to the base element.

When leveling concrete floors, it is customary to create a base element in the form of a frame into which the concrete floor is poured. Typically, a builder constructs a two-dimensional frame out of lumber and, using conventional leveling devices, assures that both dimensions (x and y directions, for example) are level with the base element (ground, for example) and that the x and y directions are at right angles. Sometimes, more recently, laser leveling system are used instead of bubble levels to assure proper alignment of the frame element.

In order to get a level concrete floor, uncured concrete is poured into a frame such as the frame mentioned above, and the concrete is leveled in all dimensions in a plane using a screed. Typically, a screed device can be a board such as a 2×4 that has a level edge. The screed device is used to level the cement in the frame by placing the level edge of the screed on two sides of the frame and using it to work and level the uncured concrete so that the concrete settles and the edge of the screen assures a level surface.

SUMMARY

One of the challenges of using a screed device is to be able to continuously monitor the levelness of the screed device, in all directions, while working with uncured building material. If a leveling device is used to assure planarity and levelness of the building material, the leveling device can come into contact with the uncured building material. Additionally, it is necessary for the builder to check the levelness in at least two perpendicular planes at the same time to assure leveling of the uncured building material—especially if there is buildup on the screed device during its use.

Provided is a leveling tool useful as a screed and for other leveling purposes. The provided leveling tool can clip onto a screed such as a wooden or metallic 2×4 or other leveling surface. The provided leveling tool has at least two leveling devices mounted thereupon that are in substantially perpendicular directions. This allows builders to just use one device (i.e. a screed) to level uncured building material and not have to switch back and forth between a leveling device and the screed while working uncured building material in a frame. Additionally, the provided leveling tool is clamped or otherwise secured on the screed but can be removed and moved to another screed as desired. Other uses of the leveling tool are contemplated and described below.

Also provided is a method of leveling uncured building material surfaces using the provided leveling tool. The method facilitates working the uncured building material surfaces in ways that are discussed below.

In one aspect, a leveling tool is provided that includes an elongated base member having a first set and a second set of opposing sides, the first set of opposing sides comprising a smooth, even edge. The leveling tool also includes a clamp having at least one level detector disposed upon a first side, the clamp further having two flexible opposing second sides that are adjacent to the first side with an opening adjacent to the two flexible opposing second sides and opposite the first side. The two flexible opposing second sides of the clamp fit snugly around the second set of opposing sides of the elongated base member.

In another aspect, a method of using a leveling tool is provided that includes providing an elongated base member having a first set and a second set of opposing sides, the first set of opposing sides comprising a smooth, even edge. The method further includes attaching a clamp comprising at least one level detecting element on a first side, the clamp further comprising two flexible opposing second sides that are adjacent to the first side with an opening adjacent to the two flexible opposing second sides and opposite the first side, wherein the two flexible opposing second sides of the clamp fit snugly around the second set of opposing sides of the elongated base member. Additionally, the method includes aligning two ends of the elongated base member of the leveling tool with a frame containing uncured concrete and adjusting the level of the frame in each of at least two dimensions using the provided leveling tool. Finally, the method includes pulling the leveling tool along the frame so that the smooth, even edge of the elongated base member smooths the surface of the uncured concrete.

In this application, the terms:

"adjacent" refers to sides that intersect with each other along a line;

"clamp" refers to a device that allows an object to fit snugly on another object. A clamp may fit by friction or may have a dimensional changing element that can change the dimension of the clamp, thereby tightening the grip of the object on another object;

"disposed upon" refers to one element located atop another element. It is possible that an intervening layer is present between the two elements;

"level" refers to conforming to a defined plane such as the ground or a wall;

"level detecting element" and "level detector" are used interchangeably;

"opposing sides" refer to two sides of an object that are located in substantially parallel planes;

"screed device" refers to a device that can help form a leveled layer of material when applied to a floor or other surface; and "set" refers to materials that change from a substantially fluid state to a substantially solid state. This may include a chemical reaction or simply removing a solvent, such as water.

The provided leveling tool can be a screed device that is to be able to continuously monitor the levelness of the screed device, in all directions, while working with uncured concrete. The provided leveling tool and method can be used to assure planarity and levelness of uncured building material. Additionally, the provided leveling tool allows the builder to check the levelness in at least two perpendicular planes at the same time to assure leveling of the concrete—especially if there is buildup on the screed device during its use.

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings, in which.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope or sprit of the present disclosure. The following detailed description, therefore, is not to be taken in a limiting sense. Unless otherwise indicated, all members expressing sizes, amounts, and physical properties used in the specification and claims are to be understood as being modified in all instances by the term "about." Accordingly, unless indicated to the contrary, the numerical parameters set forth in the foregoing application and attached claims are approximations that can vary depending upon the desired properties sought to be obtained by those skilled in the art utilizing the teachings disclosed herein. The use of numerical ranges by endpoints includes all members within that range (e.g., 1 to 5 includes 1, 1.5, 2, 2.75, 3, 3.80, 4, and 5) and any range within that range.

Embodiments of provided leveling tools can be better understood by examining the accompanying figures. These figures are only embodiments of the provided leveling tools and methods of use thereof. They should not be considered to be limiting.

In a first aspect, a leveling tool is provided that includes an elongated base member having a first set and a second set of opposing sides. The first set of opposing sides can include a smooth even surface. The provided leveling tool also can include a clamp that can include at least one level detecting element disposed upon a first side. The clamp also can include two flexible opposing second sides that are adjacent to the first side with an opening adjacent to the two flexible opposing second sides and opposite the first side. The two flexible opposing second sides of the clamp can fit snugly around the second set of opposing sides of the elongated base member.

Figure 1:
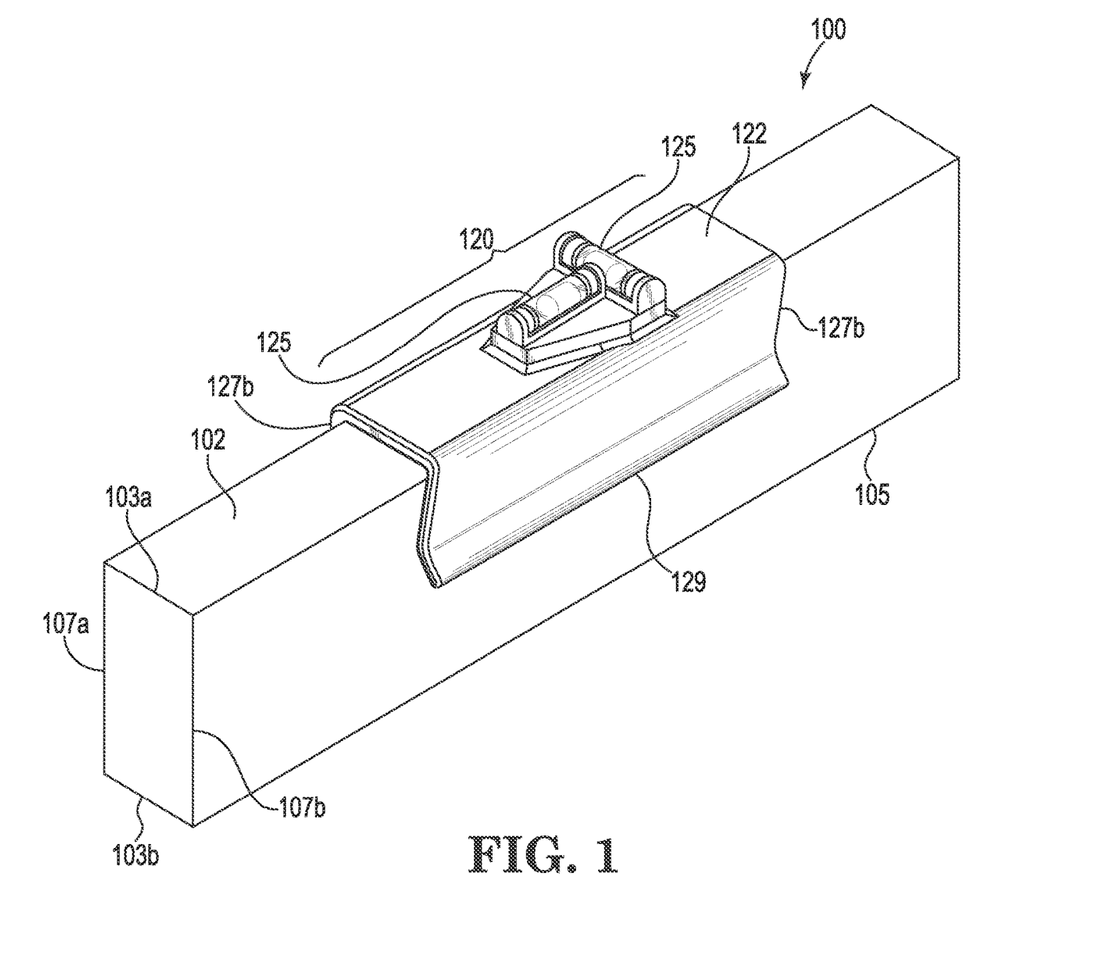
FIG. 1 is an illustration of a perspective view of an embodiment of the provided leveling tool.

FIG. 1 is an illustration of a perspective view of an embodiment of the provided leveling tool. Leveling tool 100 includes elongated base member 102. Elongated base member 102 can be constructed of any material such as metal, composite, plastic, glass, or wood. Typically, elongated base member 102 is made of wood and more typically it has a rectangular cross-section. For example, a provided elongated base member can be made from a 2×4 piece of lumber although any other sizes that are elongated are contemplated. Exemplary base members can be about 1½ inches (3.8 cm) or even 1 9/16 inches (4 cm) on the shorter side of the cross-section and about 3 inches (7.6 cm) on the longer side of the cross-section. The dimension of leveling tool 100 can be any length that can span the dimensions of a frame that is used as a guide for smoothing and a mold for uncured flooring materials such as concrete or curable ceramics, for example. Typically, the elongated length dimension of the elongated base member will be longer than the widest dimension of the frame of the mold it is used for, although this is not always the case. Typical length dimensions are from about 9 inches (22.9 cm) to about 36 inches (91.4 cm) or even about 48 inches (121.9 cm).

Figure 1A:
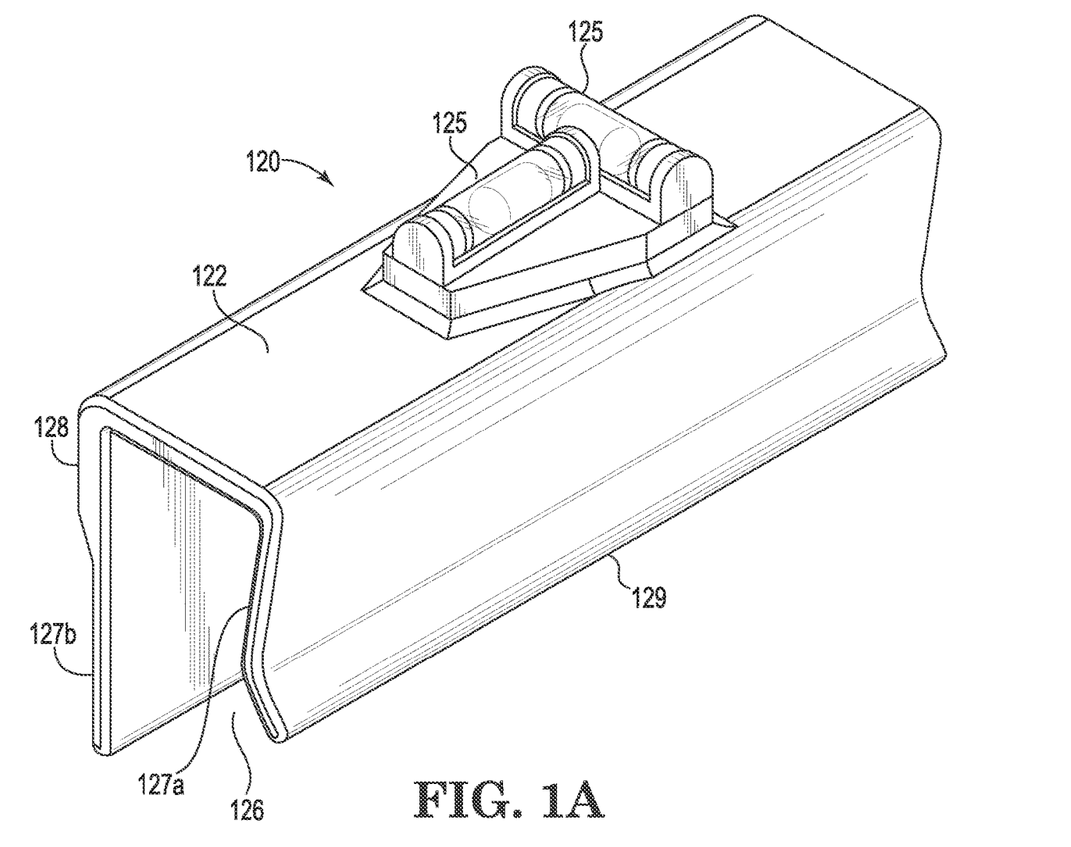
FIG. 1A is an illustration of a perspective view an embodiment of the tool portion of a provided leveling tool.
Figure 1B:
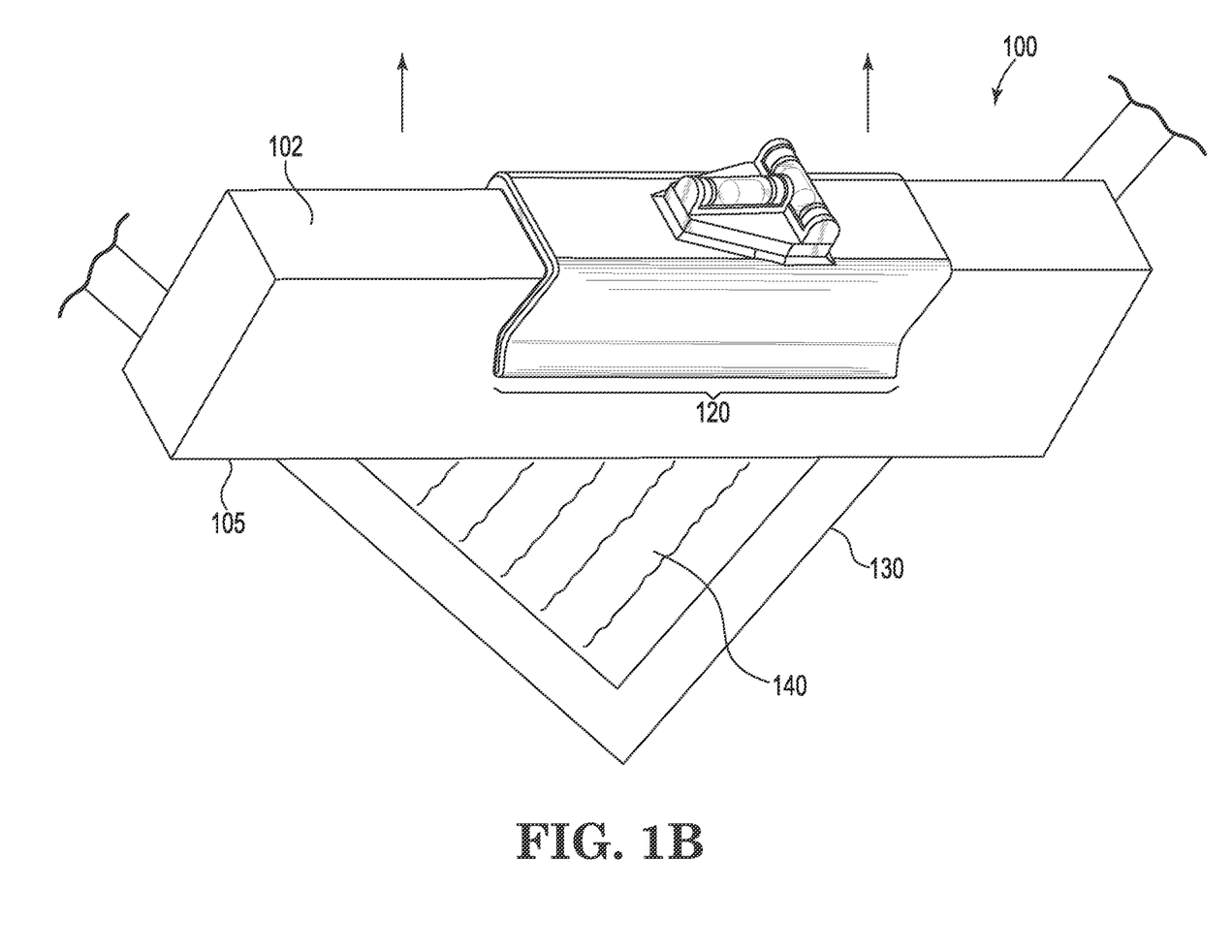
FIG. 1B is an illustration of a perspective view of the embodiment shown in FIG. 1 showing a method of using the embodied leveling tool.

The clamp portion 102 of the provided leveling tool is illustrated in FIGS. 1A and 1B. Reference numbers used in FIGS. 1, 1A, and 1B refer to the same claimed elements. FIG. 1A is an illustration of a perspective view an embodiment of the clamp portion of a provided leveling tool. FIG. 1B is an illustration of a perspective view of the embodiment shown in FIG. 1 showing a method of using the embodied leveling tool. Clamp 120 includes at least one level detecting element (level detector) 125. In FIG. 1A clamp 120 includes at least one bubble level (either of bubble levels 125) as the level detecting element. In some embodiments, such as that shown in FIG. 1A, clamp 120 includes two bubble levels 125 that are arranged substantially perpendicular to each other in the plane of and disposed upon first side 122 of clamp 120. Clamp 120 also includes two flexible opposing second sides shown as 127a and 127b. In some embodiments, the thickness of opposing side 127b may change along the length of that side. In the embodied example, opposing side 127b has a thicker top portion 128 to make that portion of the clamp more rigid so that it can fit snugly on elongated base member 102. It is also contemplated that second side 127a can also have varying thicknesses. Flexible opposing sides 127a and 127b are both adjacent to and attached to first side 122 as shown in the Figures. Two flexible opposing sides 127a and 127b fit snugly around second set of opposing sides 107a and 107b of elongated member 102. Opening 126 can be adjacent to the two flexible opposing sides 127a and 127b and opposite first side 122. In some embodiments, flexible opposing sides 127a and 127b can have different length dimensions. In the embodiment shown in FIGS. 1, 1A, and 1B, opposing side 127b is longer than opposing side 127a. In some embodiments, shorter opposing side 127a can include flange 129 useful among other things for removing clamp 120 from elongated base member 102. Flange 129 can be of any shape or length so that it allows a user to be able to pry clamp off of one elongated base member for use, perhaps, on another elongated base member. For example, flange 129 may curve out and away from flexible opposing side 127a.

Figure 2:
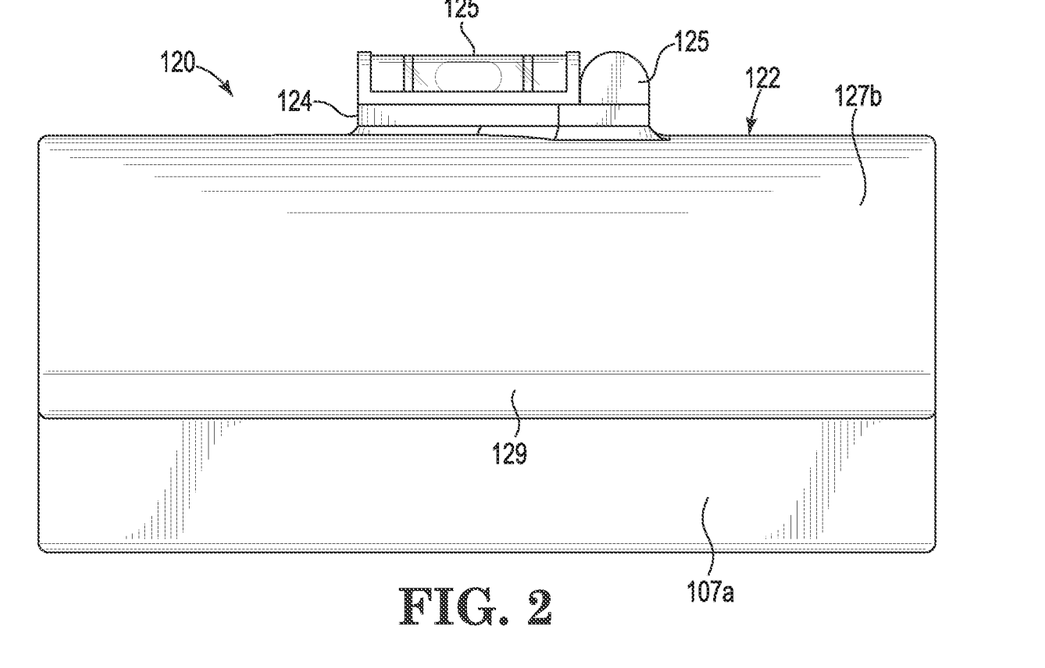
FIGS. 2 and 3 are left side and right-side lateral views respectively of an embodiment of the clamp portion shown in FIG. 1.
Figure 3:
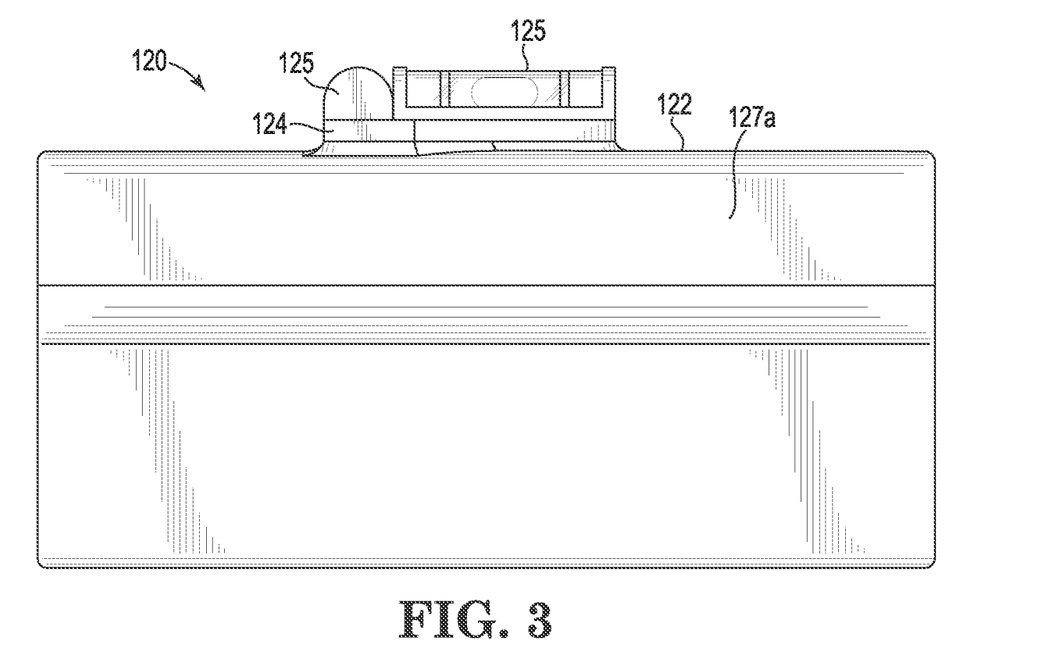

FIGS. 2 and 3 are left side and right-side lateral views respectively of an embodiment of the clamp portion shown in FIG. 1. In FIGS. 2 and 3 two level detectors 125 are mounted on top side 122 of clamp 120 using leveling detector mount 124. Level detector mount 124 can be mounted on top of clamp 120 using any type of fastener. Useful fasteners include, but not limited to, adhesives, hook and loop fasteners, mastic, brads, screws, bolts, rivets, and the like. In some embodiments, level detector mount 124 can be inset into first side of clamp 122 so that it is substantially planar to that first side 122.

Figure 4:
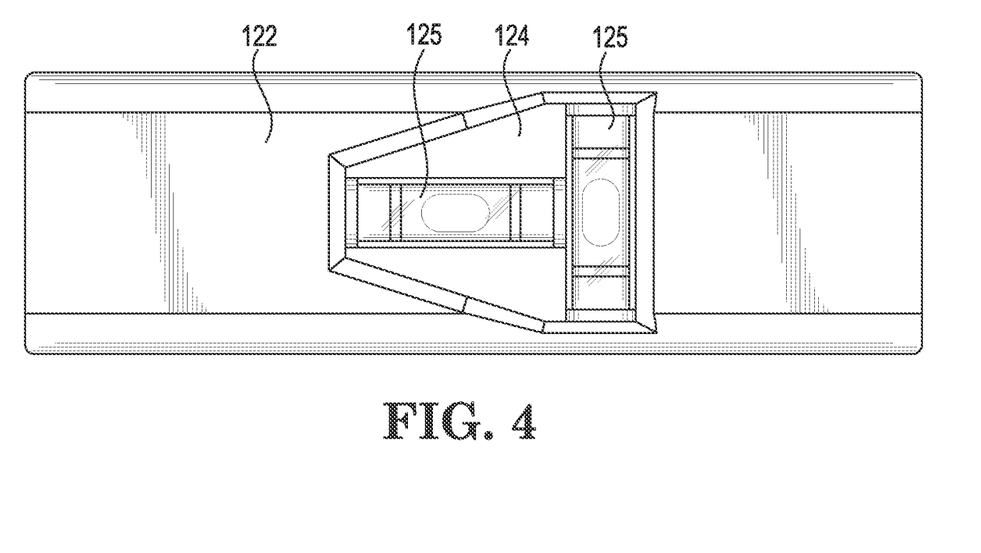
FIG. 4 is a top-down view of the clamp portion of an embodiment shown in FIG. 1.
Figure 5:
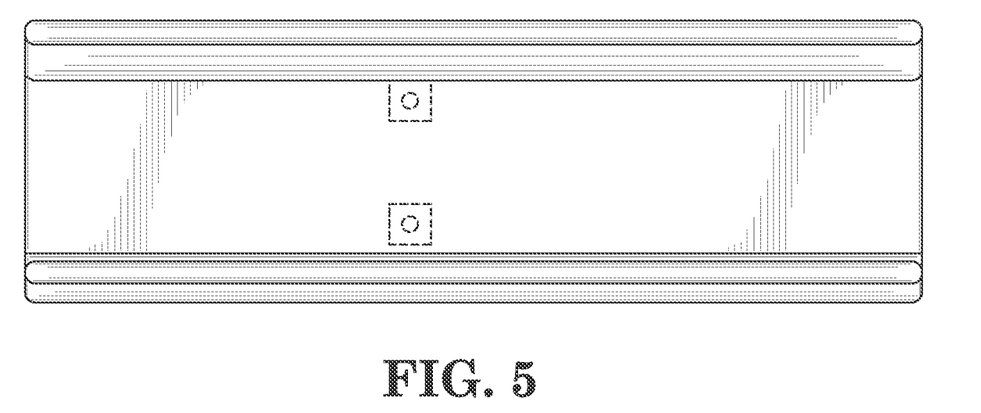
FIG. 5 is a bottom-up view of the clamp portion of an embodiment shown in FIG. 1.

FIG. 4 and FIG. 5 are top-down and bottom-up views respectively of the clamp portion of an embodiment shown in FIG. 1. FIG. 4 shows level detector mount 124 disposed upon first side of clamp 122. Also visible are two level detectors 125 that are substantially perpendicular to each other and lie substantially in the same plane as first side of clamp 122. In FIG. 5 it can be seen that level detector mount 124 is mounted to first side of clamp 122 by bolts. The nuts of the two bolts holding the mount to the clamp are visible on FIG. 5.

Figure 6:
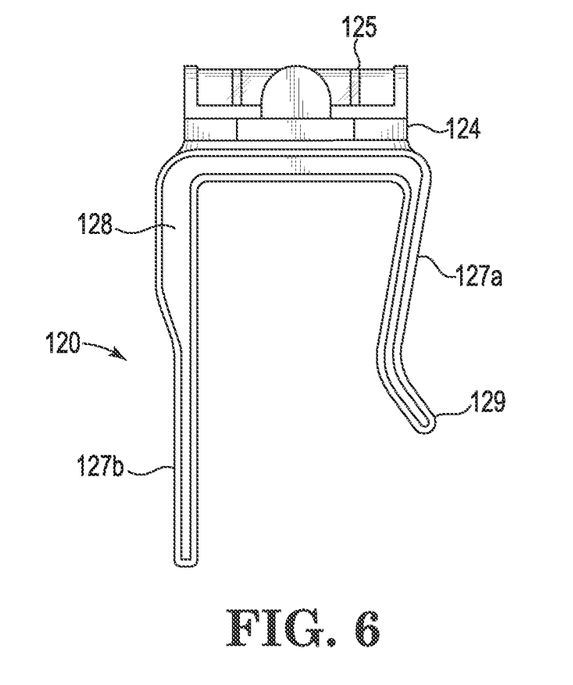
FIGS. 6 and 7 are left end and right end view respectively of the clamp portion shown in FIG. 1.
Figure 7:
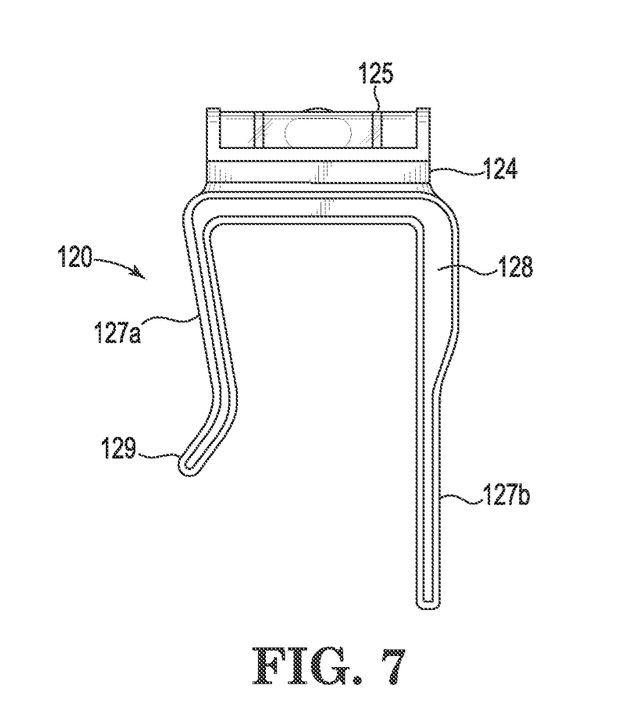

FIGS. 6 and 7 are left end and right end views, respectively, of the clamp portion shown in FIG. 1. In each view, one level detector 125 is visible and is disposed upon the first side of clamp 120 via level detector mount 124. The side views shown in FIGS. 6 and 7 show flexible opposing sides 127a and 127b of clamp 120. In the illustrated embodiment in FIGS. 6 and 7 each of flexible opposing sides 127a and 127b are made up of at least two different materials. The combination of two materials allows the development of properties such as strength and flexibility in the same part. Any combination of materials may be used for flexible opposing sides 127a and 127b. For example, materials may include but are not limited to molded plastic and extrusion plastics. In some embodiments, such as those illustrated in FIGS. 6 and 7 at least one of the flexible opposing sides can have a thicker portion 128 for firmness and strength.

Figure 8:
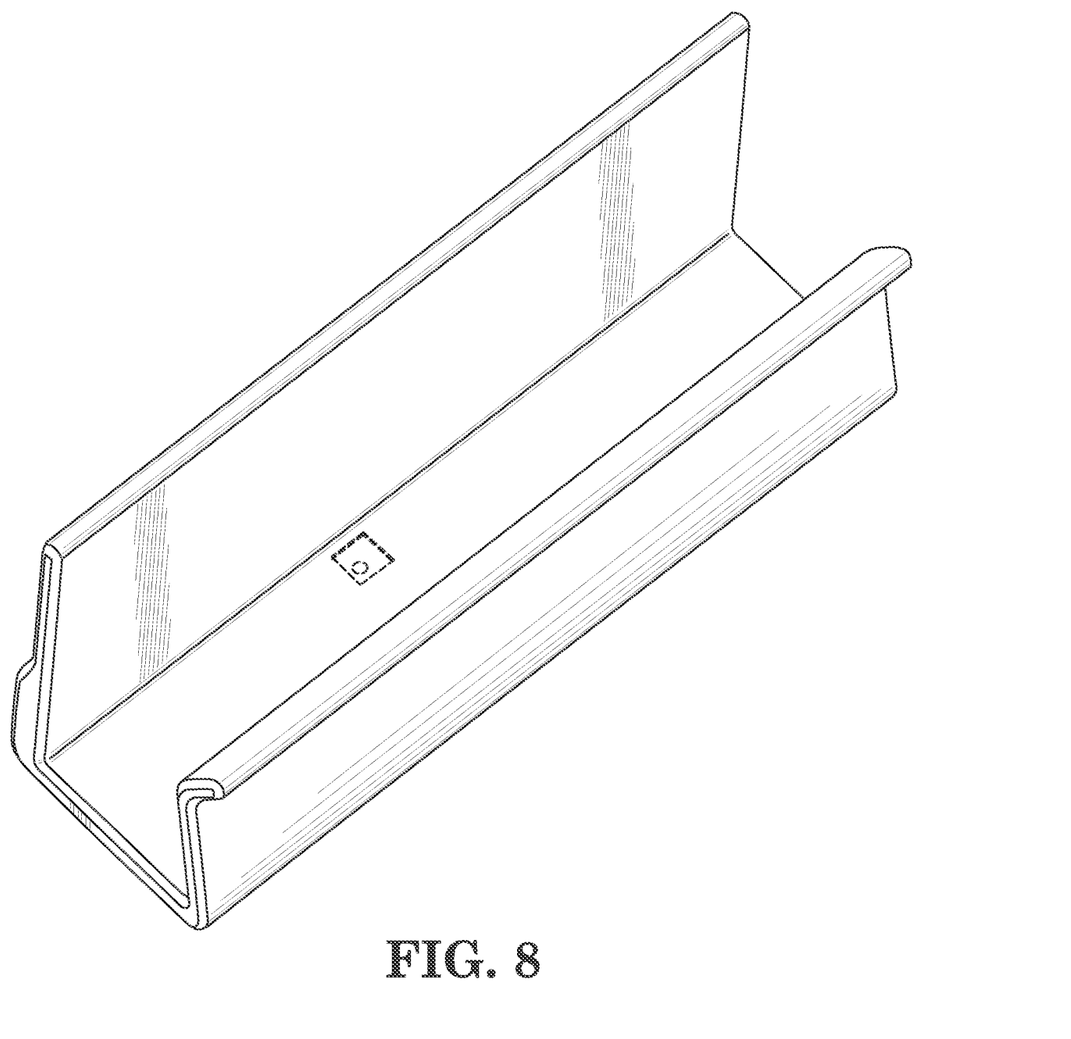
FIG. 8 is a bottom perspective view of the clamp portion of an embodiment shown in FIG. 1.

FIG. 8 is a bottom perspective view of the clamp portion of an embodiment shown in FIG. 1.

In another aspect, a method of using a leveling tool is provided that can include providing an elongated base member having a first set and a second set of opposing sides. The first set of opposing sides include a smooth, even edge. The smooth even edge is useful to as a leveling or a pitch guide. The method can further include a clamp that includes at least one level detecting element on a first side. The at least one level detecting element can be a bubble level in a linear or a circular configuration. Linear bubble levels can detect leveling in one axis of a plane whereas bubble levels in a circular configuration can detect leveling in two or more axes of a plane. The level detecting elements contemplated for the provided leveling tool are capable of providing leveling in two or more axes of a plane. This can be accomplished by aligning two linear bubble detecting elements substantially perpendicular to each other in the leveling plane. Alternatively, one circular bubble level detecting element can be used.

In some embodiments, the provided leveling tool can be used in other planes rather than the leveling plane. For example, it is contemplated that the leveling tool could be used for smoothing curable or dryable materials on a wall. In this embodiment, when the leveling tool includes at least two substantially perpendicular linear bubble detecting elements, one of the elements can detect the levelness of the wall and the other linear bubble detecting element can detect the plumbness of the wall (with respect to vertical).

The clamp can also have two flexible opposing second sides that can be adjacent to the first side with an opening adjacent to the two flexible opposing second sides and opposite the first side. In some embodiments, the flexible opposing sides allow clamping and securing of the level for materials ranging from about 1½ inches to about 1¾ inches. The two flexible opposing sides of the clamp can fit snugly around the second set of opposing sides of the elongated base member.

The provided method also includes aligning two ends of the elongated base member of the leveling tool with a frame as a guide containing uncured or unset building material. In some embodiments, the uncured or unset building material can be concrete. FIG. 1B illustrates one such embodiment. In FIG. 1B, clamp 120 is disposed upon elongated base member 102. Leveling tool 100 is disposed upon two sides of frame 130. Uncured building material 140 is within frame 130. When leveling tool 100 is pulled in the direction of the arrows, leveling tool 100 smooths the surface of uncured building material 140 due to smoothing surface 105.

The provided method also includes adjusting the level of the frame in each of at least two dimensions using the provided leveling tool. Finally, the method includes moving the leveling tool along the frame so that the smooth, even edge of the elongated base member smooths the surface of the uncured building material.

In some embodiments, leveling tool 120 can be attached to a piece of lumber that is being attached to another piece of lumber when creating, for example, a frame. The use of leveling claim 120 that the two pieced of lumber can lie in a level plane. For example, standing a piece of lumber on its end to use as a column support can require that the lumber is leaning (with respect to vertical). The provided leveling tool can ensure that the vertical piece of lumber does not lean thereby freeing the hands of the user by clamping to the lumber and allowing the user to hold the lumber and attach it to the floor/ceiling/other lumber.

Various modifications and alterations to this disclosure will become apparent to those skilled in the art without departing from the scope and spirit of this disclosure. It should be understood that this disclosure is not intended to be unduly limited by the illustrative embodiments set forth herein and that such embodiments are presented by way of example only with the scope of the disclosure intended to be limited only by the claims set forth herein as follows. All references cited in this disclosure are herein incorporated by reference in their entirety.

What is claimed is:

1. A leveling tool comprising:
    an elongated base member having a first set and a second set of opposing sides, the first set of opposing sides comprising a smooth, even edge;
    a clamp comprising at least one level detector disposed upon a first side, the clamp further comprising two flexible opposing second sides that are adjacent to and attached to the first side,
wherein the clamp comprises an opening adjacent to the two flexible opposing second sides and opposite the first side, and
wherein the two flexible opposing second sides of the clamp are structured and configured to fit snugly around the second set of opposing sides of the elongated base member.

2. A leveling tool according to claim 1, wherein the elongated base member comprises wood, plastic, composite, glass, or metal.

3. A leveling tool according to claim 1, further comprising a second level detector that is substantially perpendicular to the at least one level detector and disposed upon the first side of the elongated base member.

4. A leveling tool according to claim 1, wherein the leveling tool comprises an elongated length dimension, wherein elongated length dimension spans the dimensions of a frame upon which the leveling tool is disposed.

5. A leveling tool according to claim 4, wherein the leveling tool is used as a guide for smoothing uncured flooring materials, concrete, or curable ceramics.

6. A leveling tool according to claim 1, wherein the two flexible opposing second sides have different length dimensions, and
wherein one of the two flexible opposing sides is shorter than the other one of the two flexible opposing sides.

7. A leveling tool according to claim 6, wherein the shorter opposing side comprises a flange.

8. A leveling tool according to claim 1 further comprises a level detector mount disposed upon the clamp.

9. A leveling tool according to claim 8, wherein the level detector mount is disposed upon the clamp using a fastener, wherein the fastener comprises adhesives, hook and loop fasteners, mastic, brads, screws, bolts, and rivets.

10. A method of using a leveling tool comprising;
providing an elongated base member having a first set and a second set of opposing sides, the first set of opposing sides comprising a smooth, even edge;
attaching a clamp comprising at least one level detector disposed upon a first side, the clamp further comprising two flexible opposing second sides that are adjacent to and attached to the first side,
wherein the clamp comprises an opening adjacent to the two flexible opposing second sides and opposite the first side, and
wherein the two flexible opposing second sides of the clamp are structured and configured to fit snugly around the second set of opposing sides of the elongated base member,
aligning two ends of the elongated base member of the leveling tool with a frame containing uncured building material;
adjusting the level of the frame in each of at least two dimensions using the provided leveling tool.

11. A method of using a leveling tool according to claim 10, wherein the leveling tool further comprises a second level detector that is substantially perpendicular to the at least one level detector and disposed upon the first side of the elongated base member.

12. A method of using a leveling tool according to claim 10, wherein the clamp comprises two level detectors.

13. A method of using a leveling tool according to claim 12, further comprising aligning the two level detectors substantially perpendicular to each other in the leveling plane.

14. A method of using a leveling tool according to claim 13, further comprising moving the leveling tool along the frame in a leveling plane so that the smooth, even edge of the elongated base member smooths the surface of the uncured building material.

15. A method of using a leveling tool according to claim 10 further comprising using the leveling tool to position framing materials substantially perpendicular to a subfloor.

* * * * *